United States Patent [19]

Pease et al.

[11] 4,068,233

[45] Jan. 10, 1978

[54] RADAR SYSTEM HAVING INTERFERENCE REJECTION

[75] Inventors: William M. Pease, Weston, Mass.; Bernard Bussiere, Londonderry, N.H.; Carl E. Battles, Ashland, Mass.

[73] Assignee: Raytheon Company, Lexington, Mass.

[21] Appl. No.: 714,171

[22] Filed: Aug. 13, 1976

[51] Int. Cl.² .............................................. G01S 9/02
[52] U.S. Cl. .................................. 343/7 A; 343/5 DP
[58] Field of Search ............................. 343/5 DP, 7 A

[56] References Cited

U.S. PATENT DOCUMENTS

| 3,680,095 | 7/1972 | Evans | 343/7 A |
| 3,836,964 | 9/1974 | Evans | 343/7 A |
| 3,860,924 | 1/1975 | Evans | 343/7 A X |
| 3,911,432 | 10/1975 | Williams | 343/5 R |
| 4,010,468 | 3/1977 | Fishbein et al. | 343/5 R X |

*Primary Examiner*—T.H. Tubbesing
*Attorney, Agent, or Firm*—Herbert W. Arnold; Joseph D. Pannone; Milton D. Bartlett

[57] ABSTRACT

A radar system with digitized video having a digital interference rejection circuit for eliminating spiral interference caused by nearby radar transmitters operating in the same frequency band. Video signals from each sweep are stored in a random access memory. A comparison is made between adjacent range cells in the present "live" video signal and the video signal from the previous sweep. The output video signal to the display device is inhibited should the comparison indicate the presence of interference.

10 Claims, 4 Drawing Figures

RADAR SYSTEM HAVING INTERFERENCE REJECTION

BACKGROUND OF THE INVENTION

1. Field of the Invention

The invention relates generally to radar systems having digital processing of the returned radar signals. In particular, the invention relates to PPI radar systems with digital processing of the video signal having apparatus or circuitry for rejecting interference caused by signals received directly from adjacent radar transmitters operating in the same frequency band.

2. Description of the Prior Art

Radar systems as used for pleasure boats or commercial navigation have usually employed the PPI mode of operation in which the returned radar echo signals are displayed along radial scan lines emanating from the center of the radar indicator display. Most commonly, analog signal processing techniques have been used in which the received radar echo signals are amplified and converted to a baseband or video signals for modulating the intensity of the cathode ray tube display device.

A number of problems have become evident in such systems. First, because the received signals were used directly to modulate the beam intensity of the cathode ray tube, dim displays were presented at short radar ranges due to the high writing rate or velocity of the cathode ray tube beam upon the phosphor screen.

A second problem with such radar systems was interference caused by the reception of signals transmitted directly from other nearby radar transmitters operating in the same frequency band. This type of interference appeared as intense spiral arms radiating outward from the center of the radar presentation. Frequently this type of interference was so strong as to completely obliterate many targets of interest. The problem was particularly bothersome in a harbor navigation situation where many other radar transmitters may be expected to be operating but in which an accurate radar presentation is needed to avoid collision.

To alleviate the brightness problem, radar systems have been constructed in which the video signal is first digitized and then processed such as by storing each return signal then playing it back at a slower rate than that at which it was read in to effectively decrease the required writing rate upon the system's cathode-ray tube. However, no provisions were made for eliminating interference from adjacent radar transmitters.

In analog systems before the advent of digital video signal processing, a number of different techniques were employed for attempting to reduce the effects of interference caused by adjacent radar transmitters. Sector blanking techniques were used in which a device turned off the receiver and/or transmitter when the antenna was pointing to a specific sector in which was located an adjacent radar transmitter. Although such devices eliminated interference from equipment falling within the specified sector, all other targets were also lost. Pulse blanking circuits were used to effectively blank out the video signal during a time that an interference pulse was expected. Knowledge of when the interfering pulse is expected was required. Such knowledge had to be transmitted from the remote transmitting location. Although such systems could be used in land based situations, pulse blankers are generally inapplicable to seagoing situations. PRF discriminators were used employing a delay line and coincidence circuit to eliminate all incoming signals that don't have the same PRF as the present radar. Highly accurate and stable delay lines were required to maintain registration between adjacent sweep receive times. Most commonly used were various filter techniques, all of which substantially reduced the performance of the radar receiver and none of which completely eliminated the interference problem.

SUMMARY OF THE INVENTION

Accordingly, it is an object of the present invention to provide a PPI radar system having an acceptably high brightness level at short radar ranges as well as having the capability of rejecting interference caused by adjacent radar transmitters operating in the same frequency band.

It is further an object of the present invention to provide such a radar system employing digital processing of the received video signal.

It is still a further object of the present invention to provide such a system having an entirely digital interference eliminating circuit.

These, as well as other objects of the invention, are met by providing the combination of a PPI radar system having first means for storing digital representations of a radar return signal and means coupled to the storing means for reducing interference and/or noise. The digital representations stored within the storing means may be all or only a portion of digital samples taken of the incoming radar return signals. The interference eliminated by the interference eliminating means may be caused by reception of transmitted signals from other radar systems operating in the same frequency band as the present radar system. The radar system may further include means for producing a video signal in response to outputs from the storing means. The interference eliminating means preferably comprises means for determining the presence of the interference and means for cancelling interference from the video signal in response to the interference presence determining means. The interference determining means may further include second means for storing the digital representations of the radar return signals inputs of which are coupled to outputs of the first storing means. The digital representations stored within the second means may be only a portion of those stored within the first storing means. The interference presence determining means may include means for comparing outputs of the first and second storing means.

Objects of the invention may also be met by providing the combination of first means for storing digital representations of a radar return signal, means for reading the representations of the radar return signal out of the storing means in a time period which is greater than the time period for writing such representations into the storing means for at least some settings of a radar range scale setting, means for producing a video signal in response to the representations read out from the storing means, and means coupled to the storing means for eliminating interference in the video signal. The interference eliminated may be caused by directly received signals from other radar transmitters. The interference eliminating means may preferably comprise second means for storing digital representations of the radar return signals, inputs of which are coupled to outputs of the first storing means, means for comparing outputs from the first and second storing means, and means for eliminating the interference from the video signal in response to the comparing means. Again, the digital representations stored within the second storing means may be either all or only a portion of the digital representations stored in the first storing means. The comparing means in preferred embodiments includes means for comparing amplitudes of the digital representations read out from the storing means and from the second storing means. The interference eliminating means further comprises means for shutting off the video signal in response to the comparing means.

The invention may also be practiced by apparatus for reducing displayed interference and/or noise in a radar system which comprises the combination of means for storing at least portions of representations of a radar return signal, means for reading the representations out of the storing means, means for comparing outputs from the storing means with at least portions of input representations of the radar return signals, means for producing a video signal in response to the input representations, and means for inhibiting the video signal in response to the comparing means. The storing means may comprise either one or more shift registers or a random access memory. In the case that a random access memory is used, a digital counter is provided for addressing the memory. The comparing means preferably comprises logic comparing means such as an exclusive OR gate or an AND gate. The inhibiting means may comprise gating means which either passes or inhibits the flow of the digital representations to the video signal producing means in response to the comparing means. The digital representations preferably comprise a plurality of samples of the return signal from each radar pulse period. Each of the samples has a plurality of ordered bits. In the preferred embodiment, the storing means stores less than all the bits in each sample, storing only at the most significant bit or bits thereof.

DESCRIPTION OF THE PREFERRED EMBODIMENTS

Figure 1:
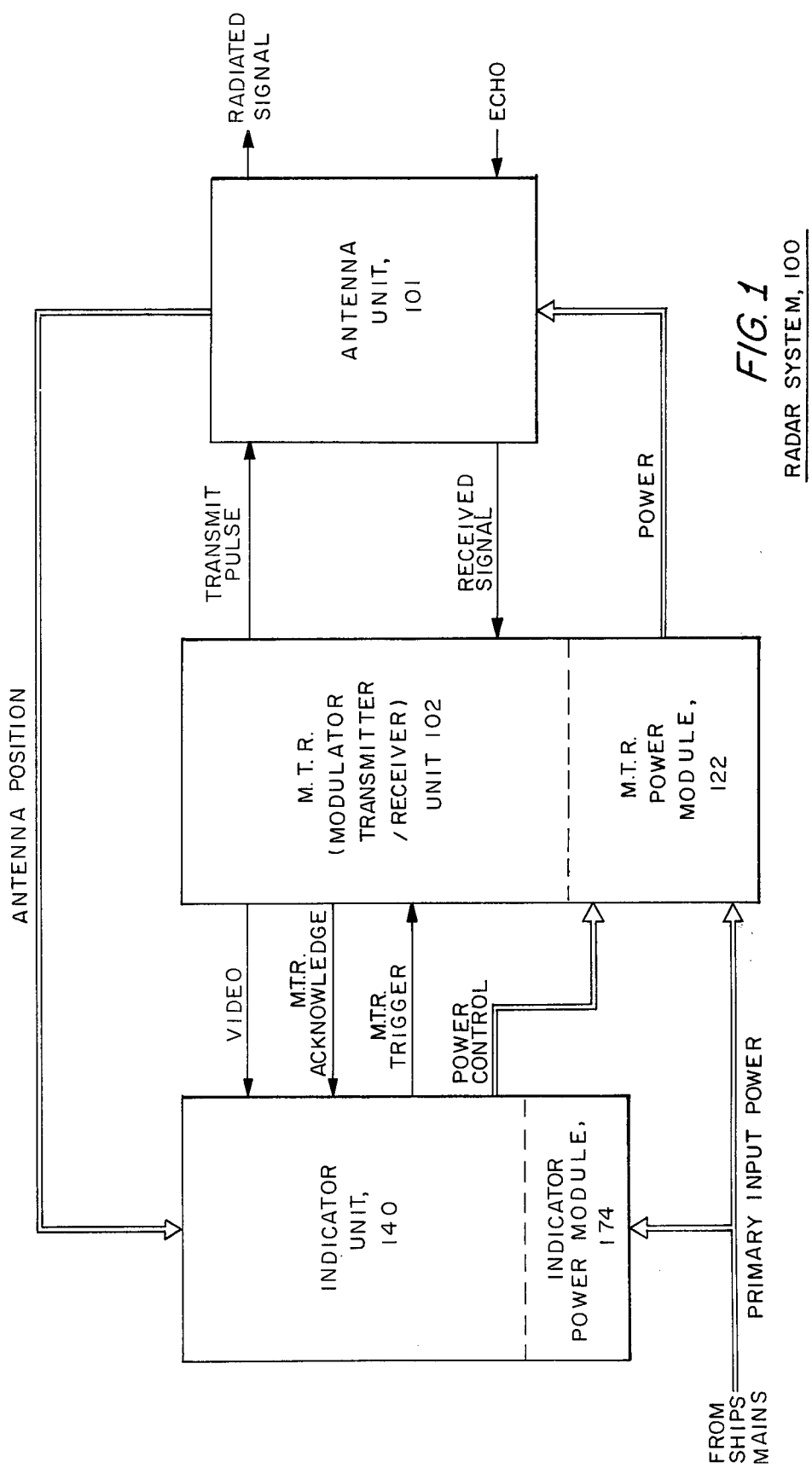
FIG. 1 is a basic block diagram of a radar system of the invention.

Referring first to FIG. 1, there is shown a basic block diagram of a PPI radar system 100 constructed in accordance with the teachings of the present invention. The radar system is constructed from three basic units: indicator unit 140, MTR (modulator-transmitter-receiver) unit 102, and antenna unit 101. Indicator unit 140, which provides the display of radar information and contains the operating controls of the system, is ordinarily mounted upon the bridge of the ship for easy access and convenience for use in navigation. Antenna unit 101 is in practice mounted as high as possible with an unobstructed path for the antenna beam to maximize the range of the unit. MTR unit 102 is located in weathertight position as close as is practical to antenna unit 101 to minimize losses in the high-power transmit pulses coupled to antenna unit 101 and the low-level receive signals coupled from antenna unit 101 to MTR unit 102.

Both indicator unit 140 and MTR unit 102 contain separate power modules 174 and 122 respectively. Both take the ship's power which may be 110 volts AC 60 cycles or any other normally provided primary input power source and convert it to DC voltages suitable for operating the various electronic circuits and electromechanical devices located within the two units. Additionally, MTR power module 122 supplies operating power to antenna 101 to the motor contained therein for rotation of the antenna. By providing separate power modules in each of the two remotely located major operating units, losses which occurred in previous units in the cabling between units is avoided. Moreover, with the system of the present invention, ON/OFF control of MTR power module 122 is accomplished from indicator unit 140 using only low signal level control voltages. Full control is therefore maintained at the indicator unit without large amounts of power dissipation and loss in long runs of cabling between units.

Each radar pulse cycle is initiated at indicator unit 140 by the production of a MTR TRIGGER pulse which is coupled to MTR unit 102. Upon receipt of this pulse, MTR unit 102 produces a high-power transmit pulse. The transmit pulse is coupled to antenna unit 101 which radiates the signal outward in a narrow beam. Echo return signals from targets are received at antenna unit 101 and relayed to the receiver portion of MTR unit 102. The receiver portion of MTR unit 102 amplifies and detects the received echo signals and produces a video signal to indicator unit 140. The commencement of the video signal is marked by an acknowledge pulse generated within MTR unit 102. Indicator unit 140 produces a visual display of the signals reflected back from targets in the path of the radar beam in accordance with the video signal. The azimuthal position of the radar antenna is relayed from antenna unit 101 directly to indicator unit 140 to indicate the angle upon the display screen the returned radar signals are to be displayed.

Figure 2:
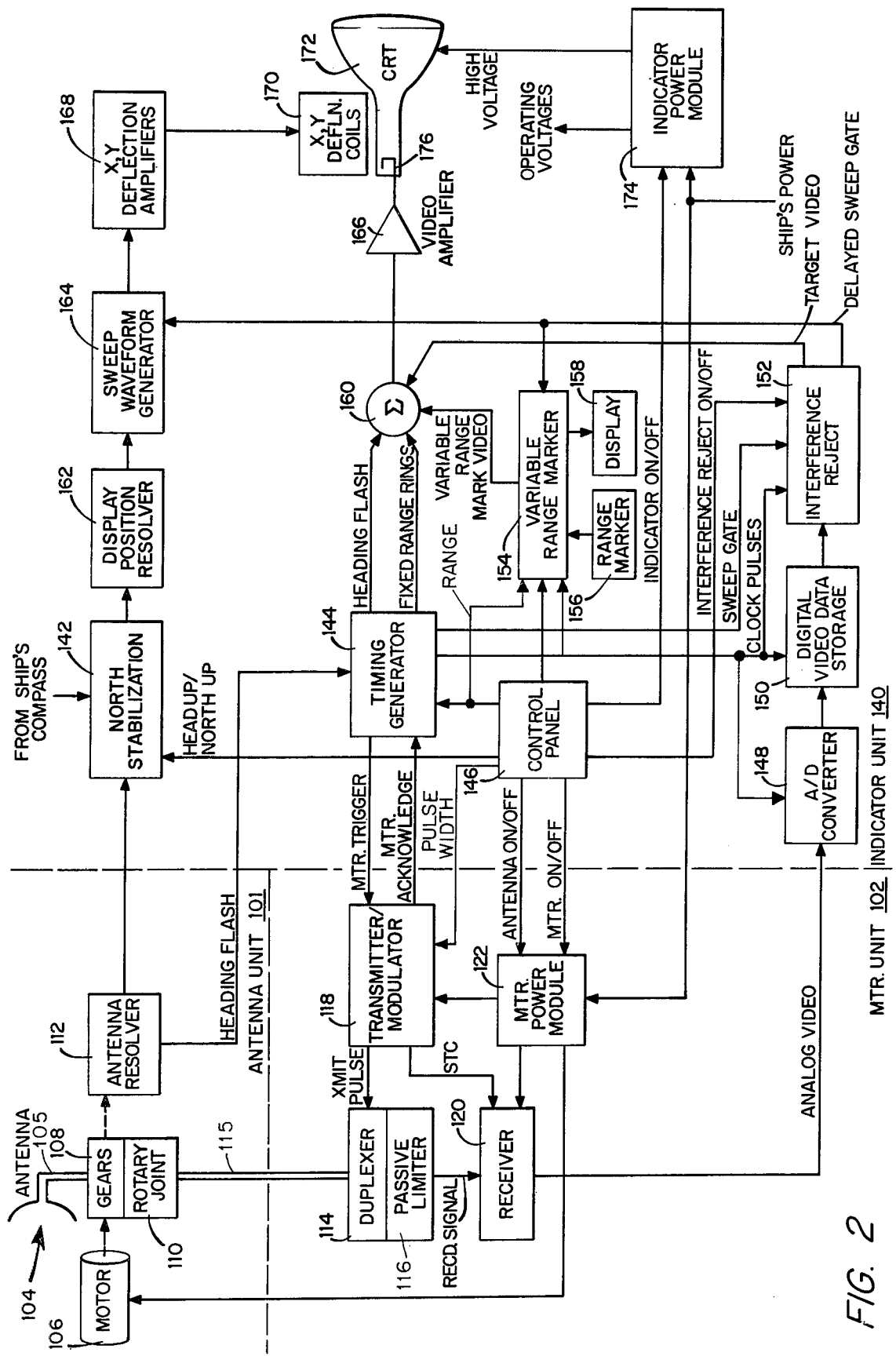
FIG. 2 is a detailed block diagram of a radar system of the invention.

Referring next to FIG. 2, there is shown a detailed block diagram of radar system 100 as shown in FIG. 1. Antenna unit 101 contains a rotatable antenna 104 capable of radiating and receiving signals within the frequency range of the radar pulses. Antenna 104 is rotatably connected to a set of gears 108 through a section of waveguide 105. Motor 106 is mechanically linked to antenna 104 through gears 108 and causes antenna 104 to rotate at a substantially constant and predetermined rate. Antenna resolver 112 is also linked through its input rotary shaft to gears 108 and antenna 104. Its input shaft is rotated preferably at the same rate as antenna 104.

Signals going to and coming from antenna 104 are coupled through rotary joint 110 within antenna unit 101 through waveguide section 115 to duplexer 114. Receive signals are passed through duplexer 114 to passive limiter 116 to the input of receiver 120. Duplexer 114 isolates the transmit pulses produced by transmitter-modulator 118 from receiver 120 and couples the receive signals directly from waveguide 115 to the input of receiver 120 without substantial loss. Passive limiter 116 provides an absolute amplitude limit upon input signals to protect the input circuitry of receiver 120 from being overloaded from signals picked up from nearby radar transmitters.

Transmitter-modulator 118 produces radar pulses in response to an input trigger signal from timing generator 144 within indicator unit 140. The PRF (pulse repetition frequency) of the transmitted radar pulses is entirely determined by the repetition rate of the MTR trigger signal produced by timing generator 144. In previous radar systems in which the PRF was a function of the radar range setting, a plurality of signals indicative of the various possible range settings was coupled to the transmitter-modulator. A decoding circuit then determined the appropriate PRF for the range chosen. With the present system however, only a single trigger signal need be provided.

The width of pulses transmitted may also be a function of the radar range scale setting. It may, for example, be desirable to use a narrower pulse on shorter range scales in order to obtain a greater definition than would be possible using the longer pulses necessary to achieve an acceptable signal-to-noise ratio on the longer ranges. However, it has been found not necessary to provide a different pulse width for every possible range setting value. For example, in the preferred system embodiment of the invention there are 10 different range settings between 0.25 and 64 nautical miles. It has been found that only three different pulse widths of approximately 60, 500, and 1000 nanoseconds are practically required. Only a two bit digital signal then need be coupled between timing generator 144 and transmitter-modulator 118 to select among the three pulse widths. As there are many fewer pulse widths required than are range scale values selectable, many fewer lines or signals need be passed between timing generator 144 and transmitter-modulator 118 than were needed in previous systems.

In previous systems a trigger pulse was generated within the MTR unit which was coupled to both the modulator and display circuitry. Because of certain characteristics of the most commonly employed modulators, the delay time between application of a trigger pulse and generation of the actual transmitted pulse may vary. This is especially true between ranges. Because of this unpredictable delay difference, targets in previously known radar systems would sometimes be displayed having an inaccurate jagged edge caused by the sweep starting either too early or too late. With the system constructed in accordance with the present invention, this problem has been eliminated.

Transmitter-modulator 118 produces an MTR ACKNOWLEDGE pulse at the commencement of each transmit pulse. This MTR ACKNOWLEDGE pulse coupled to timing generator 144 marks the beginning of the start of the radar sweep for each of the video signal processing circuits within indicator unit 140. Because the MTR ACKNOWLEDGE pulse is precisely aligned with the commencement of each radar pulse, registration between adjacent sweep lines upon the displace screen is maintained to a high precision. Thus, the actual shapes of targets are accurately presented with no jagged edges caused by imprecise synchronization of the start of the display sweep with the actual transmitted pulse.

Transmitter modulator 118 also produces a sensitivity time control (STC) signal to control the gain within receiver 120. As is well known in the art, the STC signal is used to vary the gain of receiver 120 during each radar pulse. For signals received from targets nearby the gain is reduced. In this manner the amplifying circuitry within receiver 120 is prevented from being overloaded by the strong signals from nearby targets and locally caused interference and a display having a substantially constant brilliance is produced.

The analog video signal produced at the output of receiver 120 is converted to a serial stream of digital data by analog/digital converter 148 within indicator unit 140. The rate at which samples are taken of the analog video signal for digitization and the length of the time period from the start of the radar pulse during which the analog video signal is digitized is dependent upon the radar range scale setting. For the shorter ranges, a higher sampling rate and shorter time period are used.

The digitized video signal is read into digital video data storage memory 150 under control of clock pulses from timing generator 144. Digital video data storage memory 150 stores the digitized video signal from an entire radar pulse time period. The range to which the signal is stored is of course dependent of the range scale setting. The digital video signal is read out of digital video data storage memory 150 for display upon cathode-ray tube 172 in a second time period also determined by the rate of clock pulses coming from timing generator 144. The second time period may be greater than or less than or the same as the first time period during which the video signal was read into digital video data storage memory 150. Read out occurs preferably immediately following the first time period and before commencement of the next succeeding radar time period. In preferred embodiments, the second time period is substantially constant and independent of the first time period. In this manner, with the constant read-out time period the writing or deflection rate of the beam of cathode-ray tube 172 is also constant so that the display produced is of constant intensity independent of the radar range scale setting. For short ranges, the second time period during which the digital signals are read out from digital video data storage memory 150 and displayed is substantially greater than the time period during which the signals were read in. Because of the increase in time period, the writing rate of the beam of the cathode ray tube 172 is decreased over that which would be required should the video signal be displayed at the same rate at which it is received. Hence, the brightness of the display upon short ranges is greatly increased over that of previously known systems. The preferred manner of video signal digitization, storage, and read out is described in United States patent application Ser. No. 612,882, now abandoned, filed Sept. 12, 1975 and assigned to the present assignee, which is a continuation of Ser. No. 413,130 filed Nov. 5, 1973 (now abandoned), the specification of which is herein incorporated by reference.

Interference rejection circuit 152 is provided to nullify the interference effects caused by nearby radar transmitters operating within the same frequency band. This type of interference, caused by reception of the transmitted pulses from the nearby radar, appears as plural spiral arms radiating outward from the center of the radar presentation. Interference rejection circuit 152 operates to substantially cancel this type of interference from the radar presentation without substantially effecting the presentation of desired targets. A switch is located upon control panel 146 which permits the operator to turn interference rejection circuit 152 ON and OFF as desired. The final video output signal produced at the output of interference rejection circuit 152 is coupled to video amplifier 166 via video signal summer 160.

Also provided is variable range marker circuit 154. Variable range marker circuit 154 produces an output video signal in the form of a short pulse for each radar sweep to display a circular range ring mark at a distance from the center of the radar display determined by the setting of range marker adjustment 156. Range marker adjustment 156 may physically be a part of control panel 146. A display device 158 provides a digital read out to the operator of the distance from the radar antenna to the target upon which the variable range mark is positioned. The output variable range mark video signal from variable range mark circuit 154 is coupled to video amplifier 166 through video signal summer 160.

Timing generator 144 furnishes clock and other timing signals used for the various circuits within indicator unit 140. An internal oscillator within timing generator 144 produces the clock pulses at predetermined periods. The heading flash from antenna resolver 112 which is produced each time the antenna beam passes the forward direction of the ship is reclocked by the clock pulses produced by the oscillator within timing generator 144 and coupled as a video pulse through video signal summer 160 to video amplifier 166 to produce a mark on the screen to indicate to the operator when the antenna beam so passes the bow of the ship. Timing generator 144 also produces the MTR TRIGGER signal as a pulse at predetermined fixed intervals depending upon the radar range scale setting as relayed from control panel 146. The MTR ACKNOWLEDGE signal from transmitter-modulator 118 is used by timing generator 144 to produce a SWEEP GATE signal which is a logic signal which assumes the high or active state in the time period during which video signals are being received. The SWEEP GATE signal is set in the active state as soon as the MTR ACKNOWLEDGE signal is received and set to the low or inactive state at the end of the time period depending upon the range setting selected.

Upon control panel 146 are mounted the various operator actuable controls for adjusting and determining the operation of the various circuits within the radar system. A range control is provided that determines the maximum range at which targets are to be displayed. This distance corresponds to the distance at the edge of the cathode ray tube screen. ON/OFF switches are provided for operating MTR power module 122, motor 106 of antenna 101 via MTR power module 122, interference rejection circuit 152, variable range marker circuit 154, and indicator power module 174. A switch is provided to select between head up (the direction in which the ship is pointing) or north up at the top of the display presentation.

For generating displays in which north rather than the current ship's heading is represented at the top of the display screen, north stabilization circuit 142 modifies the signals received from antenna resolver 112 before coupling them to display position resolver 162. Otherwise, for displays in which the ship's heading is displayed at the top of the screen, the signals from antenna resolver 112 are coupled directly to display position resolver 162. Display position resolver 162 takes the output signals from either antenna resolver 112 or north stabilization circuit 142 in the form of modulated sine and cosine waveforms and produces therefrom DC voltages for each radar sweep representing X and Y sweep increments. Sweep waveform generator 164 produces X and Y ramp waveforms, the maximum amplitudes of which are determined by the DC voltages from display position resolver 162. Generation of the two ramp waveforms commences at the time marked by the beginning of the DELAYED SWEEP GATE signal from interference rejection circuit 152 which in turn was produced by delaying the SWEEP GATE signal from timing generator 144 by one or more clock periods to permit interference rejection circuit 152 to perform its operation. The X and Y ramp waveforms are each coupled to X and Y deflection amplifiers 168 where they are amplified and coupled to X and Y deflection coils 170 for deflecting the beam of cathode ray tube 172 in the manner well-known in the art. The output of video amplifier 166 is coupled to cathode 176 of cathode ray tube 172 for modulating the beam intensity thereof.

The high voltage applied to the accelerating anode of cathode-ray tube 172 and all other operating voltages for the various circuits within indicator unit 140 including the voltages for biasing and operating all the logic circuits contained therein are provided by indicator power module 174. Indicator power module 174 is, as is MTR power module 122, preferably a switching power supply capable of producing at its output a plurality of voltages having the required current furnishing capabilities. The switching frequency of indicator power module 174 and that of MTR power module 122 are selected intermediate the PRF rate as determined by timing generator 144 in accordance with the range setting and the rate of digitization of the analog video signal by analog/digital converter 148. By operating the power modules at a switching rate intermediate the PRF and digitization rates, interference effects are eliminated.

Referring now to the block diagram of FIG. 3, the operation of interference reject circuit 152 will be described. One purpose of interference reject circuit 152 is to eliminate the spiral interference caused by one or more nearby radars operating in the same frequency band with a different pulse repetition frequency. The spiraling effect results from the differences in pulse repetition frequencies which cause the signal from the interfering transmitter to appear to be at a different range for succeeding sweeps. Generally, the signal produced by the interfering transmitter is of much greater strength than the normally received radar echo signals. Interference reject circuit 152 will also eliminate other types of interference, such as "speckle", such as may be caused by noise produced within the receiver circuitry or atmospheric interference.

Interference rejection circuit 152 operates upon the 2 bit digital signal produced at the output of digital video data storage 150. The digital video signal is preferably encoded to three different amplitude levels depending upon the strength of the received signal. The absence of a received signal or a received signal below a minimum level is represented by 00 (MSB=0 and LSB = 0). The strongest received signals are represented by 11. During each radar sweep the MSB (most significant bit) is stored for each range cell in succession within random access memory 204. Random access memory 204 is addressed for each range cell in succession by address counter 202 which produces a binary count beginning at the start of the SWEEP GATE signal advancing one count with each DISPLAY CLOCK pulse, the same rate at which data is read out from digital video data storage 150.

As data from each sweep time is read into random access memory 204, the MSB values for each range cell of the previous radar sweep are alternately read out of random access memory 204 to compare circuit 206 in the order in which they were originally stored. A comparison is made between the presently received value of the MSB from digital video data storage 150 and the corresponding MSB for the same range cell of the previous sweep by compare circuit 206. When the logic value of the MSB on the same range cell of adjacent sweeps are different, an inhibit signal is produced by compare circuit 206 which is coupled to output selection circuit 208. In the absence of the inhibit signal, output selection circuit 208 delays both the MSB and LSB of the digital video signal by one range cell time period before transferring them out to signal summer 160 at the same rate. If, however, the inhibit signal is present, both the MSB and the LSB of the digital video signal are set in the 0 logic state so that a 00 logic state video signal is produced for the range cell.

Interference reject circuit 152 may be turned OFF by switch 260 which is mounted upon control panel 146. In the case that interference reject circuit 152 is turned OFF, both the MSB and LSB are clocked directly through output selection circuit 208 without being subject to being forced to the 0 state in the presence of interference. The SWEEP GATE signal is also delayed by output selection circuit 208 independent of the setting of switch 260. This delay is to compensate for the delay in the digital video signal.

Figure 3:
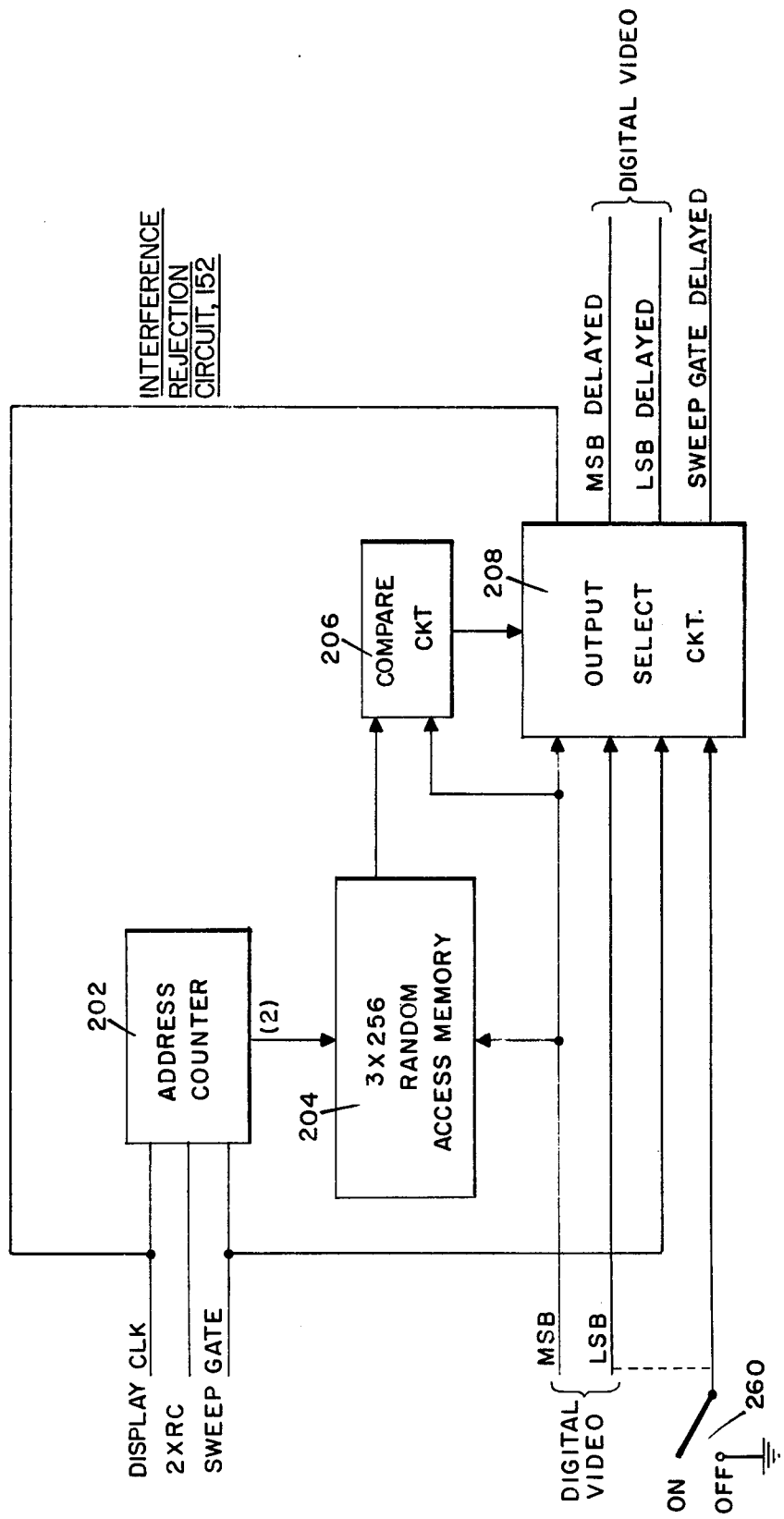
FIG. 3 is a block diagram of the interference reject circuit of the radar system shown in FIG. 2.
Figure 4:
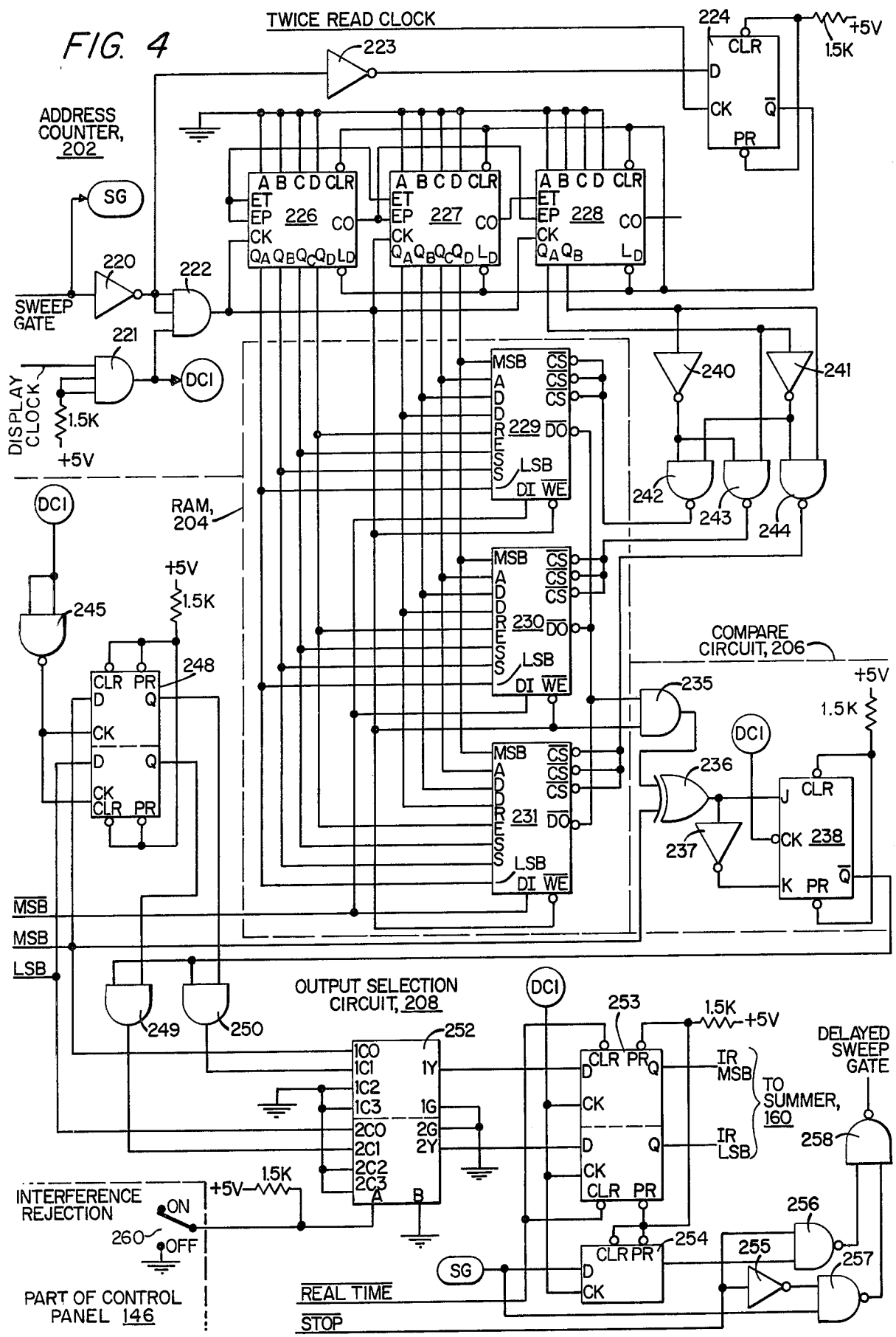
FIG. 4 is a logic schematic diagram of a preferred embodiment of the invention.

Referring next to FIG. 4 there is shown therein a schematic diagram of a preferred embodiment interference reject circuit 152 as shown in FIG. 3. The SWEEP GATE (SG) signal is inverted and buffered by inverter 220 then AND'ed with the DISPLAY CLOCK by AND gate 222 to produce the clock signal for address counter 202. One display clock pulse is present for each range cell. As explained previously, the SWEEP GATE signal assumes the logical one state in the clock period immediately preceding the first range cell of the sweep and returns to the logical 0 state at the conclusion at the last range cell. The requisite ten-bit binary count is produced by binary counters 226–228. The preset or parallel inputs of counters 226–228 are connected to ground corresponding to the logical 0 state or a start address of all 0's. A load and clear signal is produced on the $\bar{Q}$ output of flip/flop 224 between SWEEP GATE signals to set counters 226-228 in the 0 state for the beginning of the next sweep gate signal. The load and clear signal is produced by clocking the twice inverted SWEEP GATE signal at a fast clock rate which is preferably twice the rate of the display clock. This insures that the clear and load signal does not interfere with the normal counting operation.

Random access memory 204 includes three 1 × 256 bit random access memories 229–231 giving a total capacity of 768 range cells. However, a lesser number may be used depending upon the range scale selected. The ten least significant bits of the binary count output from address counter 202 are coupled to the address inputs of memories 229–231 with like ones of each address line coupled to the same count output bit. The LSB of the count output is coupled to the LSB of each memory address input with the eighth bit of the count output coupled to the MSB's. The two most significant bits of the ten bit count are decoded by inverters 240 and 241 and NAND gates 242–244 to produce three activating lines for sequentially selecting and activating each of the three memories 229–231.

The MSB of the video signal (in this case the inverse of the MSB to compensate for a logic inversion at the output of the memories) is coupled to the data input of each of memories 229–231. The inverted write enable signal for causing data to be written into memories 229–231 is identical to the clock signal produced on the output AND gate 222 used for clocking counters 226–228. The data output lines of each of memories 229–231 are coupled together in wired-OR fashion at one input of AND gate 235. The other input of AND gate 235 is coupled to the clocking and write enable signal produced at the output of AND gate 222. When this signal is in the 0 state, data is written into memories 229–231. When the signal is in the logical state, data is inhibited from being written into memories 229–231 and the output signal from the selected one of memories 229–231 is enabled to be coupled through AND gate 235 to one input of exclusive-OR gate 236. The other input to exclusive-OR gate 236 is the MSB of the current digital video signal. It is at exclusive-OR gate 236 that the comparison between MSBs of like range cells of adjacent sweeps is made. If both MSBs are in different logic states, a logical 1 is produced at the output of exclusive-OR gate 236. Otherwise, a logical 0 is produced. The result of the comparison is stored in flip/flop 238 for one display clock time period. The $\overline{\text{INHIBIT}}$ signal is thus produced at the $\bar{Q}$ output of flip/flop 238 as the inverted and delayed results of the comparison.

The incoming MSB and LSB of the current digital video signal are clocked through flip/flops 248 delaying them by one range cell or display clock time period. The delayed MSB and LSB on the Q outputs of flip/flops 248 are each AND'ed with the $\overline{\text{INHIBIT}}$ signal by AND gates 249 and 250. When the $\overline{\text{INHIBIT}}$ signal is in the logical 1 state the MSB and LSB signals are allowed to pass to multiplexer 252. If the $\overline{\text{INHIBIT}}$ signal is in the logical 0 state, the outputs of AND gates 249 and 250 will both be 0 regardless of the state of the input digital signals.

When switch 260 is set in the ON position, multiplexer 252 passes the outputs of AND gates 249 and 250 directly to the data inputs of flip/flops 253 where the signals are again reclocked then sent to signal summer 160. If switch 260 is set in the OFF position, the input MSB and LSB of the digital video signal are coupled through multiplexer 252 without being affected by the state of the $\overline{\text{INHIBIT}}$ signal. During normal system operation when the digital video processor is being used, the signal $\overline{\text{REAL TIME}}$, coupled to the "CLEAR" inputs of flip/flops 253, remain in the logical 1 state permitting flip/flops 253 to clock through the digital video signal. However, the system can also be operated by passing the digital processing and allowing the original analog video signal to be displayed. In this case the signal $\overline{\text{REAL TIME}}$ assumes the logical 0 state forcing the two outputs of flip/flops 253 to remain in the logical 0 state thereby adding nothing to the displayed video signal.

To compensate for the delay in the MSB and LSB of the digital video signal, the SWEEP GATE signal is also delayed before being coupled to other portions of the indicator unit circuitry. This delay is produced by flip/flop 254 operated at the display clock rate as are flip/flops 253. For normal system operation using the digital video signal, the signal $\overline{\text{STOP}}$ will be in the logical 1 state. The delayed sweep gate signal is then coupled out from the Q output of flip/flop 254 through NAND gates 256 and 258. If the indicator unit is to be operated using the analog video signal bypassing entirely the digital video processor in case of failure or operator preference, the $\overline{\text{STOP}}$ signal assumes the 0 state. Once inverted by inverter 255 thereby enabling NAND gate 257, the $\overline{\text{STOP}}$ signal causes the SWEEP GATE signal to be coupled out through NAND gates 257 and 258 without being subject to a delay by flip-flop 254. No delay is required when the analog video signal is being used because there are no processor delays of the video signal in this mode.

This completes the description of the preferred embodiments of the invention. Although preferred embodiments of the invention have been described, it is believed that numerous modifications and alterations thereto would be apparent to one having ordinary skill in the art without departing from the spirit and the scope of the invention.

APPENDIX
I.C. PARTS LIST

| Reference No. | Part Type |
|---|---|
| 220, 223, 237, 240, 241, 255 | SN74S04 |
| 222, 221 | SN74S11 |
| 224, 248, 253, 254 | SN7474 |
| 226–228 | SN74161 |
| 229–231 | SN74S200 |
| 235, 249, 250 | SN7408 |
| 236 | SN74S86 |
| 238 | SN74S112 |
| 242–245, 256–258 | SN74S00 |
| 252 | SN74153 |

What is claimed is:

1. In combination:
   first means for storing digital representations of a radar return signal;
   means for reading said representations out of said storing means, the time period for reading said representations out of said storing means being greater than the time period for reading said representations into said storing means for at least some settings of a radar range scale setting;
   means for producing a video signal in response to representations read out from said storing means; and
   means coupled to said storing means for eliminating interference in said video signal.

2. The combination of claim 1 wherein said interference eliminating means comprises:
   second means for storing digital representation of a radar return signal, inputs of said second storing means being coupled to outputs of said first storing means;
   means for comparing outputs from said first and second storing means; and
   means for eliminating interference from said video signal in response to said comparing means.

3. The combination of claim 2 wherein said comparing means comprises:
   means for comparing the amplitudes of the digital representations read out from said first storing means and from said second storing means.

4. The combination of claim 3 wherein said interference eliminating means comprises:
   means for shutting off said video signal in response to said comparing means.

5. Apparatus for eliminating interference in a PPI radar system caused by signals received directly from other radar transmitters operating in the same frequency band as said radar system comprising in combination:
   means for storing at least portions of digital representations of a radar return signal;
   means for reading said representations out of said storing means, the time period for reading said representations out of said storing means being greater than the time period for reading said representations into said storing means for at least some settings of a radar range scale setting;
   means for comparing outputs from said storing means with at least portions of input digital representations of said radar return signal;
   means for producing a video signal in response to said input digital representations; and
   means for inhibiting said video signal in response to said comparing means.

6. The combination of claim 5 wherein said storing means comprises:
   at least one shift register.

7. The combination of claim 5 wherein said storing means comprises:
   a random access memory.

8. The combination of claim 7 wherein said reading out means comprises:
   counter means for addressing said random access memory.

9. The combination of claim 5 wherein aid comparing means comprises:
   logic comparing means.

10. The combination of claim 9 wherein said inhibiting means comprises:
    gating means, said gating means passing or inhibiting said digital representations in response to said comparing means.

* * * * *